United States Patent [19]
Crump et al.

[11] Patent Number: 5,791,992
[45] Date of Patent: Aug. 11, 1998

[54] VIDEO GAME SYSTEM WITH INTERNET CARTRIDGE

[75] Inventors: Dwayne Thomas Crump, Apex; William Bruce Nicol, II, Raleigh, both of N.C.

[73] Assignee: International Business Machines Corporation, Armonk, N.Y.

[21] Appl. No.: 690,517

[22] Filed: Jul. 31, 1996

[51] Int. Cl.[6] .................................................. A63F 9/22
[52] U.S. Cl. ........................................................ 463/41
[58] Field of Search ................................. 463/40, 41, 42, 463/43, 44, 45; 395/237, 238, 239, 601, 611; 380/4

[56] References Cited

U.S. PATENT DOCUMENTS

| | | | |
|---|---|---|---|
| 4,490,810 | 12/1984 | Hon | 364/900 |
| 4,570,930 | 2/1986 | Matheson | 273/1 |
| 5,161,803 | 11/1992 | Ohara | 273/435 |
| 5,236,199 | 8/1993 | Thompson, Jr. | 273/439 |
| 5,350,176 | 9/1994 | Hochstein, et al. | 273/148 |
| 5,393,073 | 2/1995 | Best | 273/434 |
| 5,481,542 | 1/1996 | Logston et al. | 370/94.2 |

*Primary Examiner*—George Manuel
*Attorney, Agent, or Firm*—Anthony N. Magistrale

[57] ABSTRACT

Disclosed is a video game system for connecting to the Internet and allowing a user to transfer/receive data therefrom. The video game system includes a connector port for removably and electrically connecting a cartridge to the game console. The cartridge includes an application program stored therein, a modem and a telephone port for transferring data between the Internet and the video game system via a telephone line. A processor is electrically coupled to a system memory, the connector port and the I/O port. The processor is operative to (1) transfer the application program from the first cartridge to the system memory, execute the application program out of system memory and display an Internet graphical user interface (GUI) on the video display device and (2) execute Internet protocol programs to connect to the Internet and transfer data between the Internet and the video game system via the graphical user interface.

29 Claims, 6 Drawing Sheets

VIDEO GAME SYSTEM WITH INTERNET CARTRIDGE

RELATED APPLICATIONS

The present invention is believed to be related to the following patent application which is assigned to a common ownership:

Application Ser. No. 08/690,513 filed Jul. 31, 1995, entitled "Two Cartridge Video Game System With Text Based Internet Access" with named inventors Dwayne Thomas Crump, et al. (Attorney Docket No. RP9-96-003).

BACKGROUND OF THE INVENTION

Field of the Invention

The present invention relates generally to video game systems and more particularly, to a video game system which allows a user to access, use and transfer data over the Internet or world wide web.

Description of Related Art

In order to access and use the Internet or the world wide web (hereinafter "WWW" or "Web") today, a user must have a personal computer (PC), an Internet service provider (e.g., CompuServe, prodigy, AT&T, MCI) and a browser (e.g., IBM's web explorer). However, there is a large portion of the consumer market that would like to have access to the Internet or WWW but cannot afford the cost associated with purchasing and owning a personal computer. The cost of a PC today can be increased even further since to realize the full potential of the Internet requires a full multimedia personal computer (which can include for example, audio, speakers, microphone, high speed video (including motion video) and graphics) in order to access all of its audio and video applications. In addition, there is another large segment of the consumer market that would like Internet or WWW access but do not need or want all the software and hardware features that are contained in current personal computers (e.g., CPU, monitor, drive space). Accordingly, a much greater cross-section of the consumer market could use the Internet if owning a personal computer were not a prerequisite.

In recent years there has been a significant increase in the popularity and use of electronic video games. Video game systems are much less expensive than personal computers but, of course, are designed solely as a device for playing video games. Current video game systems include a microprocessor within a game console which uses a video screen (a television screen) for a visual output. The video game system also includes an external game controller and a user may choose from many different games by changing game cartridges. The game cartridges typically contain a preprogrammed read only memory (ROM) which contains a set of program instructions for a particular video game. These video game systems are prevalent in the home environment because they have a great deal of entertainment popularity, are relatively inexpensive (as compared to a personal computer) and can be connected to a conventional television. In addition, video game systems provide a safety feature for parents by allowing children to play the video games in the safety of the home.

Current video game systems, however, do not allow a user to access and use the Internet or world wide web. Thus, there is a desire to develop a low cost video game system that can be used not only to play video games but too access and interact with the Internet or WWW.

SUMMARY OF THE INVENTION

The present invention is directed to a video game system for connecting to the Internet and allowing a user to transfer/receive data therefrom including graphical data. The video game system includes a video port for connecting the system to a video display device (e.g., television). An input/output (I/O) port is included for connecting a control device such as, for example, a joystick or keyboard. The video game system includes a connector port for removably and electrically connecting a cartridge to the game console. The cartridge includes an application program stored therein, a modem chip set and a telephone port for transferring data between the Internet and the video game system via a telephone line.

A microprocessor is electrically coupled to a system memory, the connector port and the I/O port. The processor is operative to (1) transfer the application program from the first cartridge to the system memory, execute the application program out of system memory and display an Internet graphical user interface (GUI) on the video display device and (2) execute graphical Internet protocol programs, to connect to the Internet and transfer data between the Internet and the video game system via the graphical user interface.

The video game system of the present invention provides the advantage of allowing a user to be connected to and browse the World Wide Web as well as receive online updates of desired software applications through a low cost home video game system connected to a conventional television display. In addition, the cartridge allows the low cost video game system to perform several equivalent personal computer functions.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
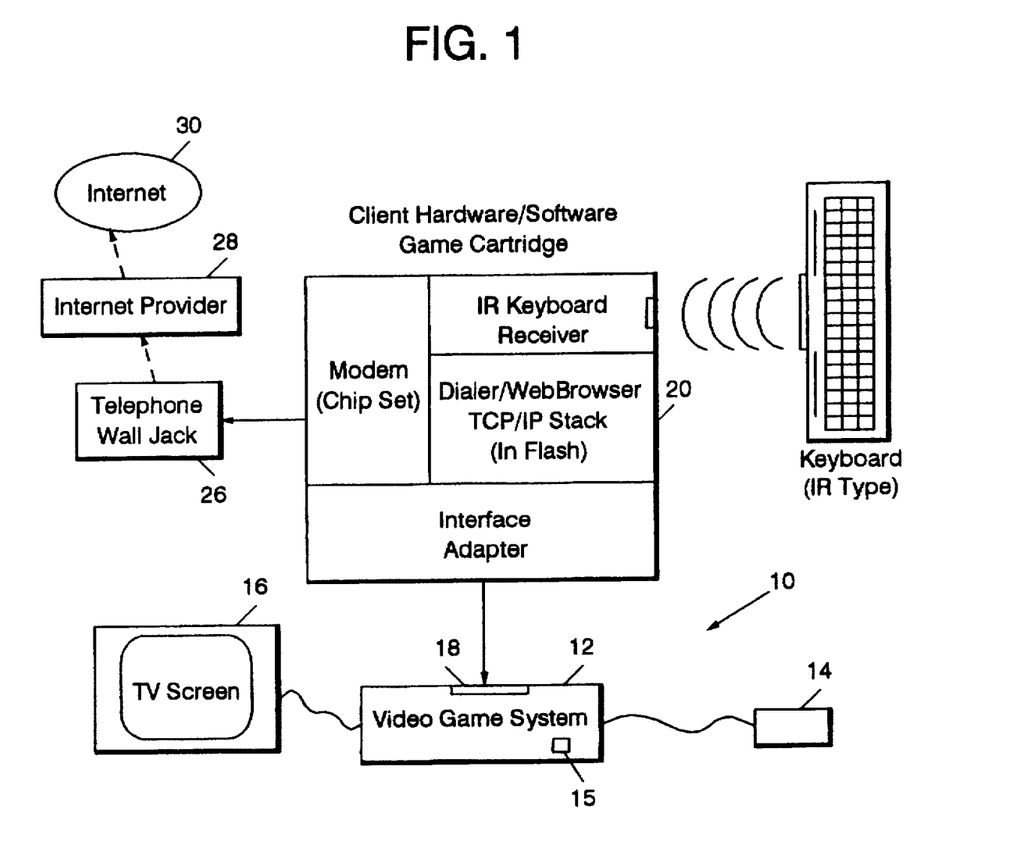
FIG. 1 is a block diagram of the video game system of the present invention.

Referring now to FIG. 1, there is shown a block diagram of the video game system 10 of the present invention. The system 10 includes a video game console 12 which includes a game processor and a low level operating system which is stored in a system memory (described in more detail below). A control device 14 is coupled to an input/output (I/O) port of console 12 and is manipulatable by a user to create local command signals to interact with the Web, Internet and a video game as will be described in more detail below. The control device can be for example, a keyboard, a joystick, a mouse or the like. The console 12 is also coupled to a video display device 16 for displaying visual images to the user (i.e., for displaying the interaction with the World Wide Web, Internet or a video game being played). The video display device 16 could be for example, a standard television set. Alternatively, the display device 16 could be a video device which accepts well known S-video. As a further alternative, the display device 16 can be a display device which accepts a composite video signal.

The game console 12 further includes a connector 18 for connecting the console 12 to a cartridge 20. The cartridge 20 has an edge card connector which connects to the game system connector 18 thereby electrically connecting devices in the cartridge 20 to devices in the game console 12. The cartridge 20 contains telephone dialer and web browser software both of which can reside in flash memory on the cartridge 20. The cartridge 20 can further include a transmission control protocol/Internet protocol (TCP/IP) protocol stack to connect to the Internet and allow more extensive use of Internet applications. The cartridge 20 also includes a modem chip set and a bus interface adapter and is coupled to a telephone wall jack 26 for communicating with an Internet service provider (ISP) 28 which provides access to the Web or Internet 30. As will be described in more detail below, the cartridge 20 interacts with the game system 12 to allow a user to access the world wide web and view the graphical data on the Web as well as send commands to the Web to navigate therein. (Game system 10 can also operate as a conventional game system wherein video game cartridges containing a preprogrammed read only memory (ROM) containing a set of program instructions for a particular video game are inserted into connector 18 and run on the game console's processor to play the video game.)

Figure 2:
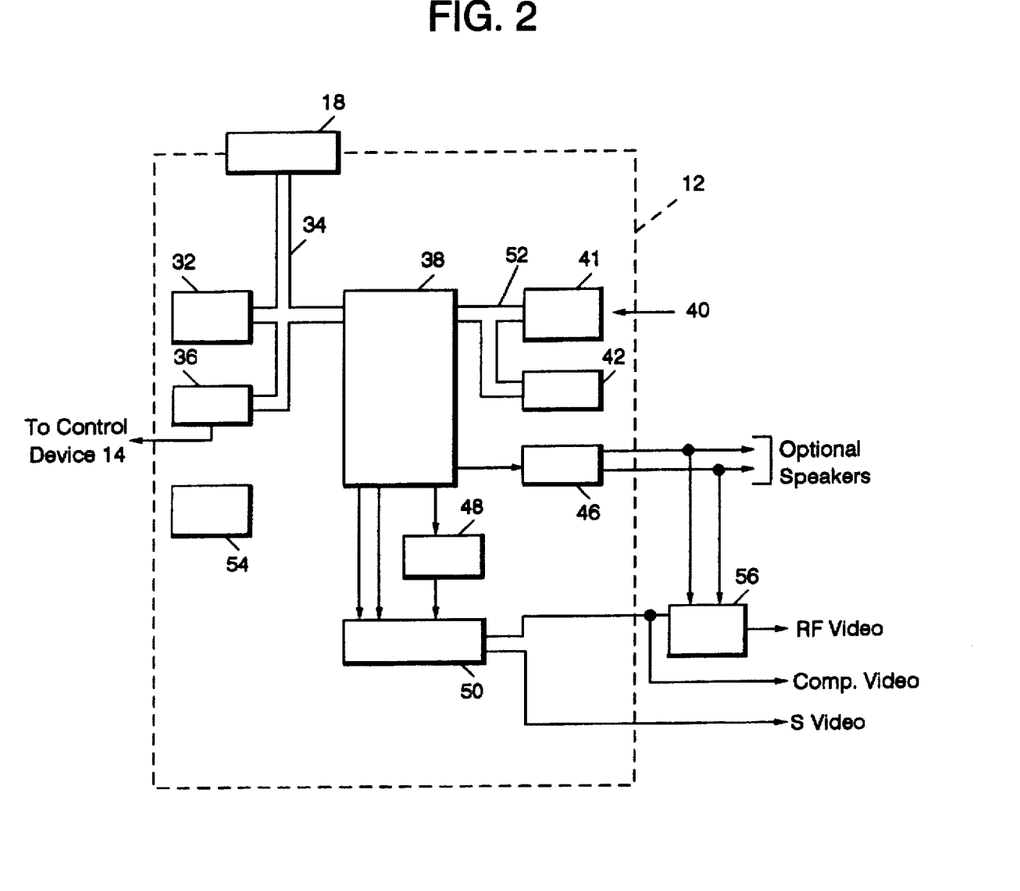
FIG. 2 is a block diagram of the game system console of FIG. 1.

A more detailed diagram of game console 12 is shown in FIG. 2. As shown therein, the video game console 12 includes a microprocessor or central processing unit (CPU) 32 coupled to a system bus 34. The system bus 34 includes data, address and control components as is well known in the art. The system bus 34 couples the CPU 32 directly to an I/O controller 36, an audio/video (A/V) controller/coprocessor 38 (hereinafter referred to as "video processor 38") and the connector 18. The CPU 32 can be a 80376, manufactured by Intel Corp. The 80376 is a variation of the well known 80386SX, which is well known in the art and also available from Intel Corp. The 80376 differs from the 80386SX in that the 80376 starts up in 32-bit mode, rather than 16-bit mode. Specifically, the CR0 register is forced to a 0011 H (0011 in hexadecimal notation) state with bit 0 forced to a logical ONE, effectively making the 376 operate in a 32-bit memory mode. Paging is enabled to allow virtual 386 operation. Alternatively, the CPU 32 can be for example, an Intel '386, '486 or Pentium processor, a reduced instruction set computing (RISC) processor or an ARM processor all of which are well known processors.

The video game console 12 further includes a system memory 40 which includes system random access memory (RAM) 41 and system read only memory (ROM) 42. System RAM 41 is used by the CPU 32 to write/read data as necessary (e.g., scratch pad functions.) System ROM 42 stores the low level operating system code which provides system boot up routines, a splash screen (i.e., power up screen) and system services. The video processor 38 is the arbitrator for the system memory 40. Accordingly, the system bus 34 is modified to a system' bus 52 (comprising data, address and control components) by the video processor 38. Thus, the system memory 40 is accessed by the video processor 38 and other components via the system' bus 52.

The video processor 38 is also operatively connected with an audio digital-to-analog (DAC) converter 46, video DAC 48 and NTSC/PAL decoder 50. Each of these elements serves functions to be described more fully hereinafter.

As noted above, the video game console 12 includes the cartridge connector 18 for placing the cartridge 20 in circuit communication with the CPU 32 and other system components. The cartridge connector 18 accepts the edge card connector of the cartridge 20. The card edge connector of the cartridge 20 matches the conductors of the connector 18, allowing the cartridge 20 to be pluggably connected to the game console 12. Connector 18 has, for example, 62 pins (two rows of 31 conductors) for connection with edge connectors on the cartridge 20. Some of the signals communicated to external devices via the cartridge connector 18 include: system bus 34 signals, a cartridge sense line, power, ground, analog interrupt 1 (a cartridge interrupt) and GPIO2 (a cartridge chip select).

The I/O controller 36 and its associated non-volatile RAM (NVRAM) 54 interface the CPU 32 to numerous I/O devices, such as control device 14. The I/O controller 36 is interfaced to the CPU 32 by configuring the controller 36 as a peripheral device. The I/O controller 36 is decoded by the video processor 38 to have four 16-bit addresses in I/O space (referred to herein as AS0, AS2, AS4 and AS6).

The program inside the I/O controller 36 interfaces to the CPU 32 as follows. The controller 36 is designed to attach directly to the processor bus 34 and act as an I/O port to the CPU 32. A pair of internal latches holds data passing between each of the processors until the other is ready to receive it. Status buts to each processor indicate the condition of the data latches. Each can tell if the previous data has been read and if any new data is waiting to be read by checking the status bits.

The I/O controller 36 implements, inter alia, the following functions: (1) a 50 ms timer, (2) a serial controller link for the control devices 14, (3) cartridge sense for determining the presence or absence of cartridge 20 in cartridge connector 18, (4) a system reset, and (5) an I²C NVRAM interface to read, write and verify the contents of NVRAM 54.

The 50 ms timer is implemented using a watchdog timer of the I/O controller 36. When the watchdog timer expires, the I/O controller 36 interrupts the CPU 32 using analog interrupt 1 (AI1) of the video processor 38. The CPU 32 responds to this by reading the 16-bit I/O port AS0 which causes the video processor 38 to activate the I/O processor 36, thereby causing a data transfer between the CPU 32 and the I/O processor 36.

Control or input devices 14 are connected to the I/O controller 36 via a serial controller link and controllers. The controllers transform the signaled movements of control device 14 into a format suitable for transmission along the serial link. The controllers send data packets via the controller serial data link to the system unit 12. The data packets differ depending on the type of control device 14. Coordinate type devices (such as a mouse, joystick, etc.) have a different data packet than a switch closure type of device (keyboard, digital joystick, switch pad, etc).

The present invention contemplates that the CPU 32 may access control application programs stored, for example, in the game system memory 40 or the cartridge 20 so as to be accessible to the processor 32, for controlling the display of visual images by the video display device 16. As will be understood by persons of skill in the design of program controlled digital devices, the processor 32 accessing such a control program will be capable of loading the control program and operating under the control of the control program so as to accomplish the functions established by the author of the program.

In executing control programs, the system 10 here described will receive and store and deliver digitally encoded data in memory devices and execute in the CPU 32 coupled to the memory devices digitally encoded control programs stored in the memory devices. The control programs will be effective on execution by the microprocessor for modifying video signals in predetermined manners in response to predetermined image directing signals derived from manipulation of the control set 14. Such execution of a control program will include controlling microprocessor access to operational resources of the television video display device 16 by execution of a low level operating system program and/or controlling modification of the video signals by execution of an application program. That is, the control exercised is based upon both operating system allocation of resource access and application program utilization of accessed resources.

Figure 3:
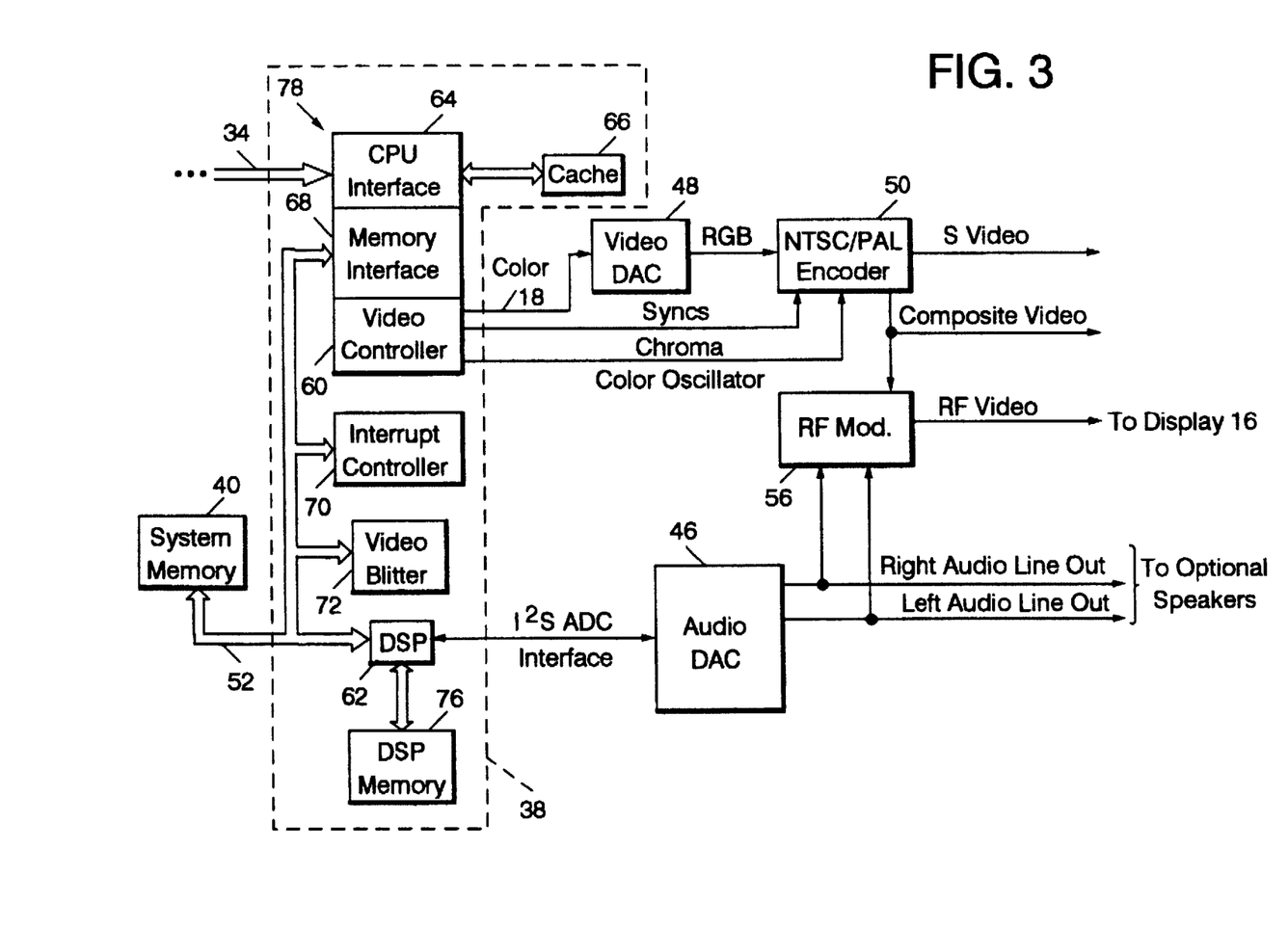
FIG. 3 is a block diagram of the video processor of FIG. 2.

Referring now to FIG. 3, there is shown a schematic diagram of the video processor 38 and additional circuitry associated with the video game system 12. The video processor 38 has a number of functional blocks that will be more fully described in the text below. It is sufficient for this point in the description to note that two such blocks are a video controller 60 and a digital signal processor (DSP) 62. The additional circuitry includes four devices: a video digital-to-analog converter (video DAC) 48, an NTSC/PAL ("PAL" referring to the well known European television signal standard) encoder 50, an RF modulator 56, and an audio digital-to-analog converter (DAC) 46.

The video controller 60 is designed to interface to television receivers such as display device 16. The controller 60 has a flexible video timing generator that can be programmed to suit different TV standards and monitors up to a 640×480 VGA standard. For example, the controller 60 supports NTSC, PAL and VGA formats and typical screen resolutions of 320×256 (NTSC), 320×226 (PAL) and 640× 480 (VGA) are supported. The exact video format is controlled by setting various registers in the video processor 38: horizontal period, horizontal sync, horizontal blanking end, horizontal blanking begin, horizontal display begin, horizontal display end, horizontal fetch begin, horizontal fetch end, horizontal sync, vertical period, vertical sync, vertical blanking end, vertical blanking begin, vertical display begin, vertical display end, video interrupt and light pen registers. The controller 60 has three color resolutions available: 4 bits per pixel (16 colors), 8 bits per pixel (256 colors) and 16 bits per pixel (64K colors). Screen/color resolution is only limited by the installed memory 41.

More specifically, the video controller 60 connects to the video DAC 48 which converts eighteen bits of pixel information (six bits each of red, green, and blue) from the video controller 60 into an RGB signal, as is well known in the art. Each color channel (R, G, and B) of the video DAC 48 is implemented with an R2R resistor tree and a 2N2222 transistor. The RGB signal is converted to NTSC composite video with the NTSC/PAL encoder 50. The NTSC/PAL encoder 50 accepts chroma clock, HSYNC and VSYNC signals which are generated by the video controller 60, and red, green and blue video outputs which are generated by the video DAC 48, and generates a composite video signal in the well known NTSC or baseband video format. In the alternative, the well known PAL (European television signal standard) format can be generated. In addition, the NTSC/PAL encoder 50 also provides an S-video output for televisions or display devices which support S-video.

An RF modulator 56 merges the composite video signal from the NTSC/PAL encoder 50 with the left and right audio line out signals from the audio DAC 46 onto a carrier frequency to generate an RF video signal, indicated by RF Video, suitable for being directly input into the television 16. To generate the different PAL (European television signal standard) and NTSC formats a different RF modulator and crystal must be used. The RF video signal is connected to external display devices with a single female Type F coaxial connector, as is well known in the art.

The audio DAC 46 is linked to the DSP 62 with a serial link conforming to the well known Philips I$^2$S protocol. The audio DAC 46 converts digital data to analog data. The audio DAC 46 interfaces digital data from the video processor 38 to external devices by generating left and right audio line out signals. These signals are connected to external devices, such as optional speakers with two female RCA phone jacks, as are well known in the art. As mentioned above, the audio line signals are also added to the RF video signal. Alternatively, in place of audio DAC 46, an analog-to-digital, digital-to-analog CODEC can be used to provide additional functions including optional microphones.

The video processor 38 electronics are largely contained within one massive custom logic chip, known as an Application Specific Integrated Circuit or ASIC. A video processor meeting the description herein may be purchased from MSU Ltd. As illustrated in FIG. 3, the video processor 38 contains a processor interface 64, a processor cache 66, a memory interface/refresh 68, a video controller 60, an interrupt controller 70, a video blitter 72, a digital signal processor (DSP) 62 and a DSP memory 76. The processor interface 64, the memory interface/refresh 68, and the video controller 60 are referred to collectively as the video/memory controller 78.

The system' bus 52 electrically connects the various devices to the system memory 40. Sharing the system' bus 52 are five possible bus masters (in order from highest priority to lowest priority, respectively): the memory refresh 68, the video controller 60, the DSP 62, the blitter 72, and the CPU 32 (through the processor interface 64). Only one of the bus masters may control the system' bus 52 at any one time. The video memory/controller 78 includes an arbitrator to arbitrate the access to the system memory between the five possible bus masters. The arbitrator controls the changing priorities of the devices and is in electrical circuit communication with all the devices within the video processor 38. For example, the CPU 32 has the lowest priority of all bus masters until an interrupt occurs. Thus, the arbitrator is in circuit communication with both the CPU interface 64 and the interrupt controller 70.

The video/memory controller 78 controls the system' bus 52, and provides the memory timing signals (e.g., CAS, RAS, write enable, etc.) for memory devices attached to the system' bus 52, as is well known in the art. It also requires memory cycles (video memory cycles are required to read video data from system RAM 41; since video is generated in real time by this process, the video logic must have memory access when video data is needed), and has effectively the highest priority on the system' bus 52, as mentioned above. It suspends bus master operations during video lines for brief periods to fetch any video display data, and to refresh dynamic RAM (DRAM) 41. It also controls the interface with the CPU 32.

The address space of the CPU 32 is decoded to a number of eight-bit registers within the video processor 38. All internal locations are on even address boundaries; word-wide I/O reads and writes may be performed where appropriate. In addition to these eight bit registers, the video processor 38 generates three spare general purpose I/O decoder lines (GPI01, GPI02 and GPI03) from the system bus 34, each providing a 32-bit I/O address range. The general purpose decoders may be used to provide three active low chip enables to devices external to the video processor 38.

The video/memory controller 78 supports five interrupt sources: video input interrupt, three analog interrupts and a DSP interrupt. The analog interrupts allow simple analog-to-digital converters to be implemented. The video/memory controller 78 also has an interrupt enable register allowing all five interrupts to be independently enabled or disabled. Writing a logical ONE to any bit in the interrupt acknowledge write register clears the corresponding interrupt. The interrupt read register reflects all pending interrupts.

The video/memory controller 78 decodes the 16 megabyte address range of the CPU 32 into a memory map for system RAM, system ROM, cartridge ROM and internal memory. The internal memory comprises palette RAM, blitter registers, and DSP registers and memory.

The system memory 40 includes screen RAM, system RAM and system ROM. The on-board screen RAM and system RAM is 1 megabyte of DRAM 41. The on-board DRAM comprising the screen/system RAM may be either 16-bits or 32-bits wide. The size of the DRAM is determined by the video processor 38 during reset but does not directly affect the CPU 32. Instead, it allows the video/memory controller 78 to operate more quickly leaving more bandwidth available to other bus master candidates. Certain display and blitter modes are only possible with 32-bit memory.

The system ROM 42 is always 16 bits wide. The ROM 42 comprises two erasable programmable read-only memories (EPROMs). Following a reset, a one megabyte window containing ROM and internal memory is repeated throughout the 16 megabyte address range. This allows for a variety of processors to boot with the video processor 38. The memory map above is adopted the first time with the memory type register is written to by the CPU 32. The video/memory controller 78 performs page mode cycles on the system memory 40 wherever possible. These are quicker than normal memory cycles and occur if successive reads and writes are within the same page.

The video/memory controller 78 supports seven types of transfers: a normal DRAM cycle (4 clocks), a page mode DRAM cycle (two clocks), ROM cycles (6 clocks), internal memory (2 clocks), external I/O (6 clocks), interrupt acknowledge (2 clocks), and internal I/O (2 clocks). The CPU 32 will cycle in one more clock cycle than the actual transfer. Internal bus masters can cycle in the transfer time.

The video/memory controller 78 uses a crystal oscillator for a crystal that is the 2X (2 times speed) clock for the CPU 32 and is a multiple of the television chrominance (chroma) subcarrier. This crystal clock is buffered and output to the CPU 32. The same clock is put through a divide by two and this is output as the main system clock. This clock is input to the video processor 38 through a separate pin. The reason for outputting and inputting the clock is so that the relative skew between the CPU 2X clock and the main system clock, can be adjusted one way or the other by adding small delays to either path. The crystal frequency also is divided by a programmable divider which can divide the crystal frequency by a number between 1 and 15 and produce an output waveform with an even mark to space ratio. This is used as the television color subcarrier.

The chroma divider register is a 4-bit register that defines the ratio of the television color subcarrier (chroma) to the 2X crystal frequency. It should be programmed as follows: chroma=2X crystal frequency/chroma frequency−1. The DSP audio coprocessor 62 is a general purpose arithmetic, very high-speed processor for sound synthesis, operating at up to 33 million instructions per second (MIPs). Synchronous serial outputs are provided for a generation of stereo audio signals with 16 bit precision, giving a sound quality normally associated with compact disc technology. It has access to the system' bus 52 via a DSP DMA controller (not shown), which allows it to read and write bytes or words into system memory 40. These transfers occur in short bursts, and are under DSP program control. The DSP 62 actually executes programs and stores data in its own private high-speed memory 76. The DSP 62 is intended to be used for single task audio applications. The DSP 62 uses Harvard architecture (separate program RAM and data RAM) for maximum data throughput.

The DSP 62 has an arithmetic logic unit (ALU). The ALU features a hardware 16-bit by 16-bit hardware multiply/accumulate as well as addition, subtraction, and logical functions. There is also a separate serial divide unit, which generates one quotient bit per tick, and a DMA channel. Data transfers within the device are all 16 bits wide, with the exception of internal transactions within the multiplier/accumulator. Common arithmetic operations are encoded as instructions; uncommon instructions can be performed by directly setting up the ALU mode bits with the general purpose arithmetic instruction.

The DSP 62 executes all instructions in one processor cycle; these instructions are executed at the system clock speed (typically 20 to 33 megahertz). During sound synthesis, the DSP 62 has its timing controlled by timers in an audio digital-to-analog converter (DAC) interface. These DACs are double-buffered, and if a DAC write is about to cause overflow, then operation is suspended until the buffer is empty. So long as the software to executes loops at sample rate, and as long as the average loop time is less than the sample period, then occasional loops can be up to twice as long. Because the loop may contain more instructions than will fit in the program RAM, the DSP 62 has an indexed addressing mode, which allows the same piece of code to act on several voices.

The DSP 62 has a DSP memory 76 associated with it. The DSP memory 76 comprises program RAM, data RAM, a register/constant table, and a sine ROM. The DSP memory 76 in general is accessible in both the DSP's internal address space as well as the address space of the system memory 40. The DSP program RAM is 512 18-bit words. These locations may only be written by the CPU 32, and are program read-only as far as the DSP 62 is concerned. Program RAM does not appear in the DSP internal address space. The program RAM is not accessible to the host when the DSP 62 is running. Each DSP instruction has a 7-bit opcode and an 11-bit address vector. All instructions are system memory 40 to register transfers or register to register transfers; immediate values are not allowed. Thus, if a constant is needed for a given instruction, it is not available in the constant table, a data RAM location must be set aside for the value. The DSP 62 also allows conditional instructions and indexed addressing. The sine ROM is 256 16-bit words of full sine wave two's complement sine wave values. The data RAM is 512 16-bit words.

Data may be transferred between the CPU 32 and the DSP 62 either under control of the DSP 62 or under the control of the host CPU 32.

The DSP 62 also has a serial audio digital-o-analog convertor (DAC) interface. The serial DAC interface allows the DSP 62 to drive a synchronous serial ($I^2S$ or similar) DAC. The interface timing can be internally generated if no input device is attached, but if a data source is present, then it must be used to determine the timing. An internal overflow detector prevents the DSP 62 from writing to the DAC before the previous output data has been fully output. This is governed by write to the first of two DAC registers. Therefore, DAC transfers should take the form: write to the first DAC register, write to the second DAC register, read input values. These should be performed in close succession (less than 16 instructions). There is no detection of underflow, and should this occur, then the previous output value will be output again. The DAC values are doubled buffered, so that although audio code should loop at an average rate less than or equal to the sample period, it is possible for occasional passes through the loop to take up to two sample periods. This may be useful for exception processing The interrupt controller 70 interfaces four internal interrupts to the CPU 32: video interrupt (highest priority), analog interrupt 1 (AI1) (I/O processor 36), analog interrupt 2 (AI2) (cartridge slot 18) and DSP interrupt (lowest priority). The interrupt controller 70 automatically clears an interrupt when the CPU 32 performs an interrupt acknowledge cycle. A mask bit is available for each of the interrupts.

The blitter 72 is a graphics processor for fast graphics creation and animation, acting as a hardware graphics subroutine for the CPU 32 or DSP 62. It executes commands written by the CPU 32 and the DSP 62 into memory. It can perform arbitrarily long sequences of graphics operations by reading new command sets from system memory 40. While it is performing graphics operations, the blitter 72 becomes a system' bus master, and denies the CPU 32 any bus activity whatsoever. This is reasonable because the bitter 72 is being used to perform operations that the CPU 32 would otherwise have performed, and is therefore speeding up program operation. This also removes the need for any synchronous control programming for blitting operations and the need for any interrupt generation hardware in the blitter 72.

However, to allow real time programming of the DSP 62, the blitter 72 will suspend its operation and grant the system' bus 52 to the DSP 62 DMA channels if they require a DMA transfer. It will also suspend itself and give up the system' bus 52 to the CPU 32 if an interrupt occurs. During any of these transfers, the current operation is suspended but will restart when the interrupt signal becomes inactive or when the DSP 62 DMA access completes. The CPU 32 is the lowest priority bus master at the system level; however, it has complete control of the other hardware, therefore, the use of the system' bus 52 is entirely under CPU 32 program control.

The blitter 72 has a versatile comparator to allow intelligent blitting operations, and a logic function unit (LFU) to generate the output data. The LFU can combine the contents of the data registers in a number of useful ways to produce the output data and the comparator can perform certain comparisons on the data to inhibit write operations, and optionally stop blitter operation.

The logic function unit generates the output data, which is written to the destination in system memory 40. It can perform any logical combination of the source and destination register pixels. "Source data pixels" may be selected from either of the source data register or the data pattern data register. The LFU selects any of the four Boolean minterms (A & B, $\overline{A}$ & B, A & $\overline{B}$, and $\overline{A}$ & $\overline{B}$) of the two sets of input data from the data registers, and generates the logical OR of the two selected minterms. This allows any logical combination of input data; thus 16 functional possibilities exist.

The comparator can perform a variety of comparisons on the data in the source, destination, and pattern data registers. If its comparison conditions are met, then it generates an inhibit signal. The inhibit signal is used to inhibit a write operation, and optionally, to stop the blitting operation. The comparator may also be used to provide a pixel plane effect, to give transparent colors, for collision detection and system memory 40 search operations, and as an aid to character painting.

The cache 66 is not a cache in the sense that it prefetches instructions for the CPU 32. Rather, the cache 66 is a 512×16-bit static RAM that can be used by the CPU 32 for variables, stack, or program code to speed up program execution.

Placing data, stack, or program code in the cache 66 allows quicker accesses and fewer page faults.

Figure 4:
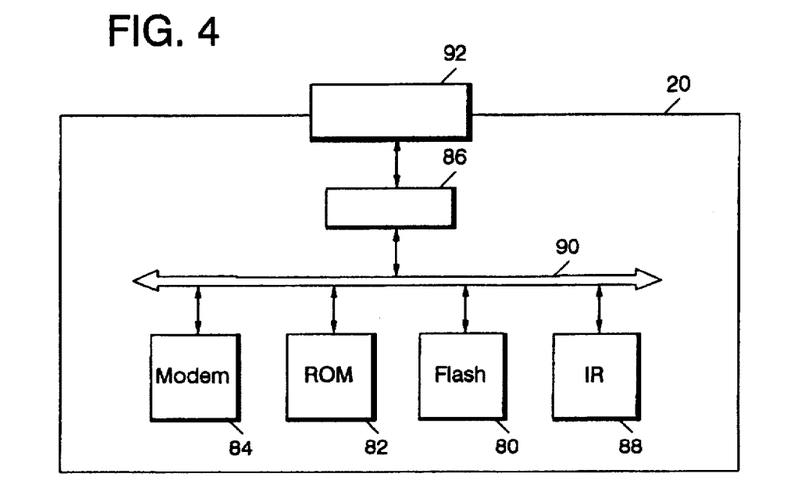
FIG. 4 is a block diagram of the game cartridge of FIG. 1.

Turning now to FIG. 4, there is shown a block diagram of the internet cartridge 20.

The cartridge 20 includes a flash memory 80 in which application programs and data from the internet can be stored, a ROM 82 in which a dialer program, a web browser 20 and a TCP/IP protocol stack or control core are stored. The code in ROM 82 runs on the video game system 12 as an application program. The cartridge 20 further includes a modem chip set 84 and an interface adapter or glue logic 86. The modem 84 can be any AT style PC type modem chip set for communicating information over a standard telephone line. For example, the modem chip set 84 can be any one of those sold by, for example, Rockwell or U.S. Robotics. Power is supplied from the game console 12 to the modem chip set 84 via a pin on the edge connector 92.

The bus interface adapter 86 acts as a bridge between the modem signals and the bus architecture of the game system 12. More specifically, the bus interface adapter 86 provides an interface between the PC type AT signals of the modem 84 and the bus 34 of the game system 10. An optional infra red (IR) module 88 can be coupled to the bus 90 to allow an IR keyboard 87 to be used instead of a cable connected keyboard or joystick 14. Modem 84, ROM 82, flash memory 80 and IR module 88 are coupled to each other and interface adapter 86 via bus 90. The cartridge 20 connects to the conector 18 of game system 12 via the edge card connector 92. The connector 92 has 62 edge connection pins which match the conductors of the game connector 18 allowing the cartridge 20 to be electrically and removably connected to the game system 12. The connector 92 receives and delivers such signals as an address or display signal, a control signal and a data or display signal.

Figure 5:
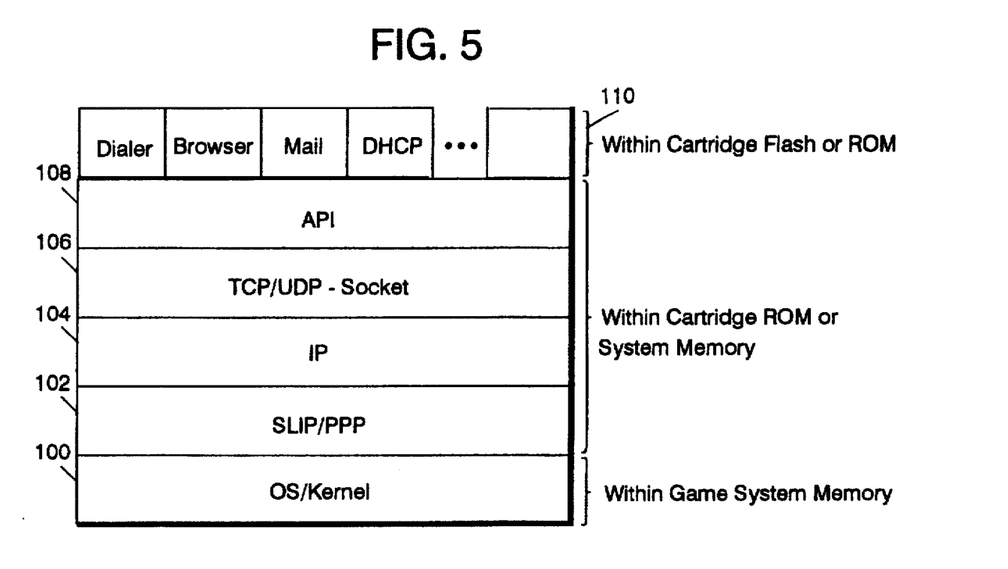
FIG. 5 is a diagram of the software architecture of the game system console of FIG. 1.

Referring to FIG. 5, there is shown a block diagram of the software architecture for game system 12. At the core or kernel area 100 is the low level operating system for the game system 12 which can be stored in system ROM 42. The operating system comprises the basic software that is used to control and manage all the hardware and the software of the system 12. The next layer is a user interface which comprises the serial line internet protocol/point to point protocol (SLIP/PPP) 102, the TCP/IP stack 104,106 and application program interface (API) 108. This second layer is used to support the application programs and interprets a command from a user and transmits it to the core (OS) area and also transmits a response from the core to the user. This second layer can be disposed within the cartridge ROM 82 or the system ROM 42. The second layer could be located in cartridge ROM 82 if the game system 82 did not contain a stack, or within the game system ROM 42 if it did contain a stack.

The highest software level consists of application programs 110 which allow system 12 to be used for practical and specific purposes. The application programs 110 comprise Internet application such as a web browser, mail, news reader, etc. In addition, this layer 110 would also include the dialer program used to connect the modem 84 to the internet via the phone line. It could also contain more complex Internet applications such as an Internet phone, audio, video, etc. All the application programs would be located in the cartridge flash memory 80 except the dialer which is stored in the cartridge ROM 82. Flash memory storage for the application programs allows online updating of Internet or WWW applications which provides a user a way to always have the latest version of the application software. In addition, flash memory 80 is used to "cache" web pages (so that the most recently accessed pages are quickly retrieved) and save audio or video files to provide multimedia features from the internet. It should also be noted that each one or any group of applications may be stored on different cartridges so that to run different programs, a user would simply replace one cartridge 20 with another cartridge having the different programs. For example, data from the WWW or different phone number preferences can be stored on different cartridges.

Figure 6:
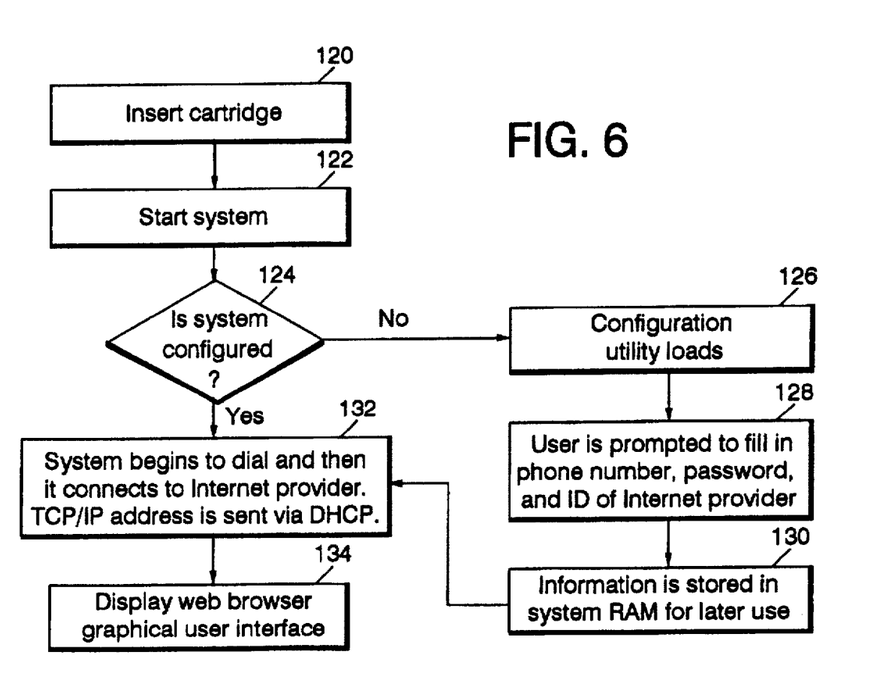
FIG. 6 is a flow chart of system operation of the game system of FIG. 1.

The operation of the game system 10 will now be described with reference to FIG. 6. First, a user inserts the cartridge 20 into the connector 18 of the game system 12, at task 120. Next, the system 12 is started by depressing a power button 15, at task 122. Then, at task 124, under control of the operating system, the system 12 will check whether it has been configured and if not, then execution will proceed to task 126 where the system will load a configuration utility program from ROM 42 into RAM 41. Next, the program will prompt a user to fill in the phone number, password and identification number of an Internet service provider at task 128. This information will be used to connect to the service provider. This information is then stored in the cartridge flash memory 80 for later use. This information can be entered in any number of ways. If the control device 14 is a keyboard, then a user can type in this information. It should be understood that the phone number should be entered in an AT type command format (e.g., ATDT 9,898—9898) such that the program will, at the appropriate step below, send the command to the modem 84 and be recognized. Alternatively, any of the PF keys can be pre-programmed with AT commands of the ISP's phone number, etc. and by pressing on that PF key the information will be entered. If the control device 14 is a joystick, then the user could select from a list of phone numbers displayed on the screen 16 with the joystick's directional and select ("fire") buttons.

Execution then proceeds to task 132. Of course, if the system was configured at task 124 (e.g., pre-programmed ISP phone number, identification, etc.) then execution would proceed directly to task 132 from task 124. At task 132, the system dials the phone number of the service provider in flash RAM 80 and via modem 84 a connection is established with the service provider and thus the internet. Next a web browser graphical user interface (GUI) is displayed on screen 16 at task 134 and a user can now brows the Web.

Figure 7:
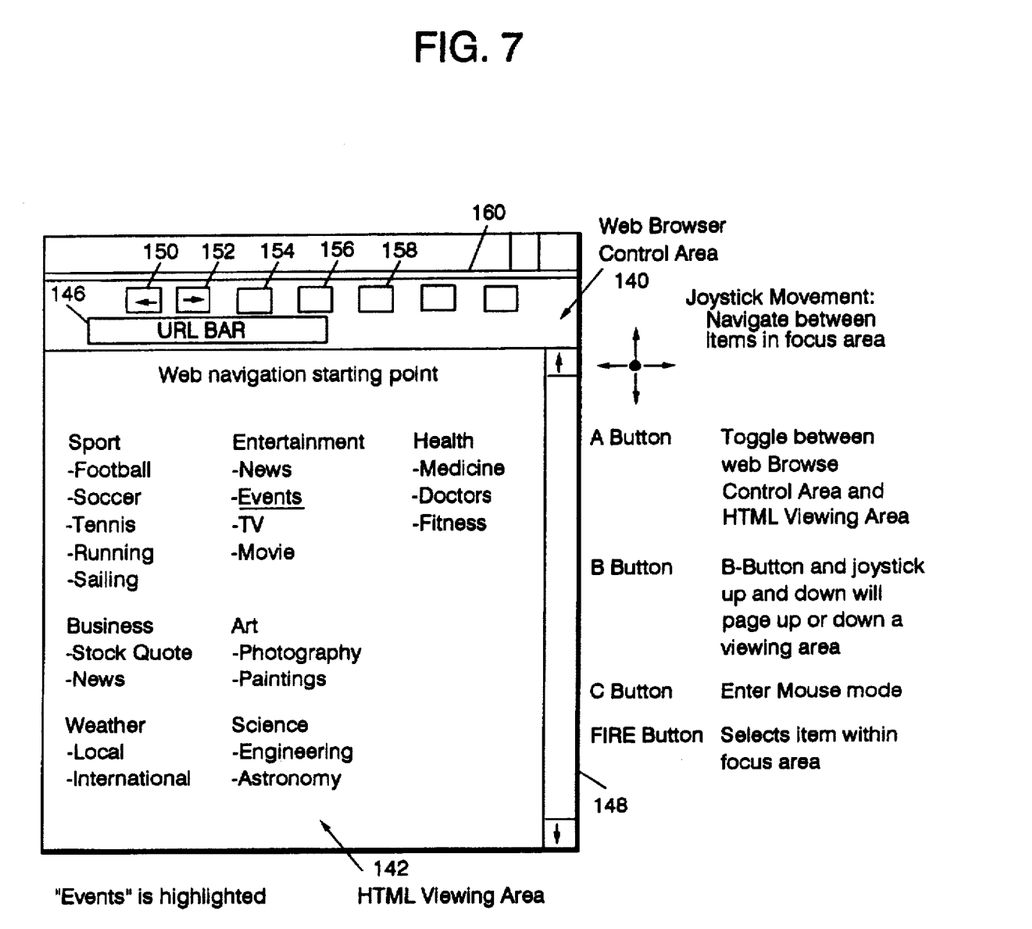
FIG. 7 is diagram of a web browser that can be used in accordance with the game system of FIG. 1.

Referring now to FIG. 7 there is shown an example of a web browser interface displayed on the screen 16 that can be used in accordance with the present invention. The web browser comprises two main areas; a web browser control section 140 and an HTML viewing area 142. The control section includes "back" 150, "forward" 152, "home" 154, "reload" 156, web map 158 buttons, a pull down menu tool bar 160 which includes such features as File, Edit, View, Bookmarks, Window, Help, etc, a uniform resource locator (URL) bar 146 and a scroll bar. The web map function is very useful in that it stores and lists the frequently accessed pages for quick response and return to those pages. The HTML viewing area 142 is simply where the HTML document is viewed.

A user can navigate through the control section 140 and viewing area 142 with either a keyboard, mouse or joystick 14. If the controller 14 is a joystick, a user can navigate between the two areas 140 and 142 with the "A" button. Once in one of the two areas, the user can navigate between buttons, tool items, or hypertext by moving the joystick. Once a desired area is highlighted then the "fire" button can select it. By holding down the "B" button and moving the joystick up or down will perform a page up-down function. Depressing the "C" button will place the joystick in mouse mode. This will allow the user to navigate around the browser with the joystick in the same manner as a typical personal computer mouse. In addition, in this mode a user could move the mouse cursor to the bottom of the web page and this would automatically perform a page down function.

Figure 8:
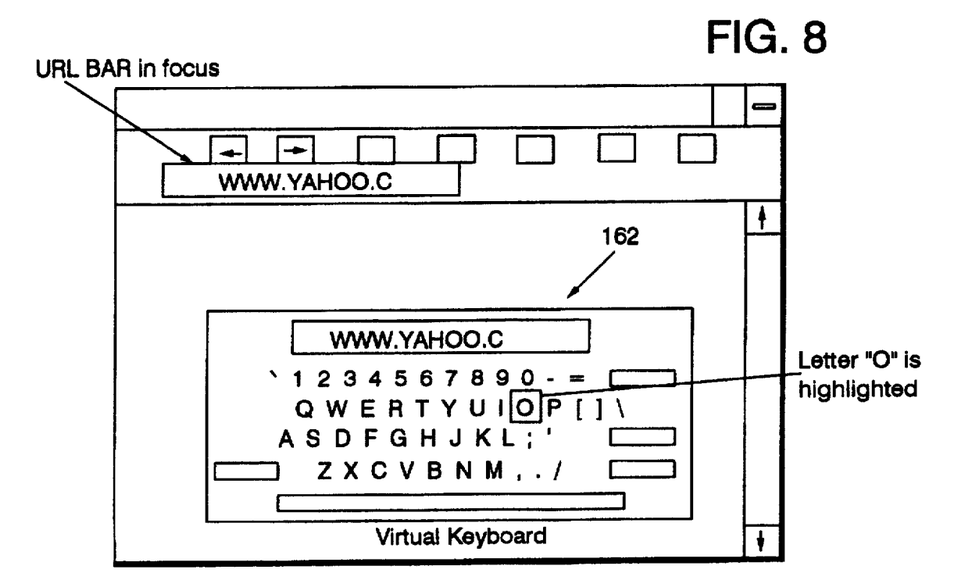
FIG. 8 is a diagram of a virtual keyboard that can be used in accordance with the game system of FIG. 1.

Once either the URL bar 146 or an HTML text fill-in box is highlighted then the user can type in text with an IR keyboard or a standard keyboard connected to system 12 with a cable. Alternatively, as shown in FIG. 8, if the control device 14 is a joystick, the user can enter text using a virtual keyboard 162 and the joystick. Once the URL bar 146, an HTML text fill in box or part of an HTML page which allows text to be entered is highlighted, a user can call up a virtual keyboard 162 by pressing the fire or select button on the joystick. The user can then "type" in text using the virtual keyboard 162 and the joystick. More specifically, the user can use the directional button of the joystick to navigate around the virtual keyboard 162 and select letters with the select button. As each letter is selected in this manner, it will be entered into the appropriate text fill in box or space.

The video game system of the present invention can include a higher level web browser. The higher level web browser can reduce typing from the virtual keyboard, the IR keyboard or the standard keyboard as the higher level browser can guess and automatically type "http:/www." at the beginning of the URL bar 146 and ".com" at the end of the URL bar 146. For example, the browser may automatically type "http://www.__.com" and a user would simply need to fill in the "__" area.

Accordingly, the video game system 10 of the present invention provides the advantage of allowing a user to be connected to and browse the World Wide Web as well as receive online updates of desired software applications through a low cost home video game system connected to a conventional television screen. In addition, the cartridge 86 allows the low cost video game system to perform several equivalent personal computer functions.

While the invention has been particularly shown and described with respect to preferred embodiments thereof, it should be understood by those skilled in the art that the foregoing and other changes in form and detail may be made therein without departing from the spirit and scope of the invention as defined in the appended claims. For example, the modem chip set 84 can be replaced with a local area network (LAN) chip set wherein a user could connect directly to the Internet or WWW across any Internet network connection (e.g., T1 line).

What is claimed is:

1. A video game system comprising:

a video port for connecting to a video display device for displaying visual images to a human observer, a connector port for receiving a cartridge which can be removably connected to said connector port, an I/O port for connecting to a control device, a system memory for receiving, storing and delivering system data and video data, said cartridge having an application program stored therein, a modem and a telephone port for transferring data between an Internet and said video game system via a telephone line, a processor electrically coupled to said system memory, said connector port and said I/O port, said processor being operative to (1) transfer said application program from said first cartridge to said system memory, execute said application program out of system memory and display an Internet graphical user interface (GUI) on said video display device and (2) execute graphical Internet protocol programs, to connect to said Internet and transfer data between said Internet and said video game system via said graphical user interface.

2. The video game system of claim 1, wherein said graphical Internet protocol programs are stored in a non-volatile memory in said cartridge.

3. The video game system of claim 1, wherein said graphical Internet protocol programs are stored in said system memory.

4. The video game system of claim 1, wherein said application programs includes a web browser program and wherein upon connection to said Internet said system displays a web browser graphical user interface.

5. The video game system of claim 4, wherein said cartridge includes flash memory which can cache more recently used web pages.

6. The video game system of claim 4, wherein said web browser includes a URL bar for entering web addresses in the form of first, second and third address portions where the second portion is sandwiched between the first and third portions, wherein said web browser is operative to automatically type the first and third portions such that the user only need type in the second portion.

7. The video game system of claim 4, wherein said web browser graphical user interface includes a web browser control area and an HTML viewing area, said control device is a game joystick having a first button for toggling between said web browser control area and said viewing area, a directional button having up and down directions for moving a cursor on said display, a second button which in conjunction with said directional button can page up or page down the viewing area and a select button for selecting an item on said viewing area.

8. The video game system of claim 4, wherein said control device is a joystick having (1) a directional button for moving a cursor on said display and (2) a select button for selecting an item in focus, wherein text data can be entered on an area of said web browser using said joystick and a virtual keyboard.

9. The video game system of claim 1, wherein said cartridge includes a flash memory for storing data transferred between the Internet and the game system and wherein said flash memory allows online updating of software when said system is connected to said Internet.

10. The video game system of claim 1, further including a bus for interconnecting said processor with said connector port and said I/O port, said bus having a protocol for carrying data address and control signals.

11. The video game system of claim 10, wherein said cartridge further includes an interface adapter disposed between said modem and an edge connector on the cartridge, said interface adapter being operative to convert modem signals sent from said modem into game bus signals and vice-versa.

12. The video game system of claim 11, wherein said interface adapter is operative to translate said modem signals in accordance with a modem protocol to game bus signals in accordance with said bus protocol.

13. The video game system of claim 11, wherein said telephone port is for connecting said cartridge to an analog telephone wall jack.

14. The video game system of claim 11, wherein said telephone port is for connecting said cartridge to a digital telephone wall jack.

15. The video game system of claim 1, wherein said processor is coupled to a local bus and said video game system further includes a video processor coupled to said local bus, said non-volatile storage device and said volatile storage device, said video processor being operative to process video display signals under the direction of said CPU to control said video display device in accordance with the application program stored in the volatile storage device.

16. The video game system of claim 15, wherein said video processor provides and interface between said local bus and a memory bus which is coupled to said system memory.

17. The video game system of claim 1, wherein said system memory includes a non-volatile storage device for storing operating system code and a volatile storage device for storing said application program.

18. The video game system of claim 1, wherein said control device is a keyboard.

19. The video game system of claim 1, wherein said control device is a pointing type mouse.

20. The video game system of claim 1, wherein said control device is an infra-red keyboard, said cartridge further includes an infra-red module receiver for receiving signals emitted by said infra-red keyboard and converting said infra-red signals into character signals.

21. The video game system of claim 1, further including a video processor coupled to said processor and said system memory for controlling said system memory and providing memory arbitration between bus master devices which can access and control the system memory bus, said video processor being further coupled to said video port and being operative under control of said microprocessor to deliver video display signals to said video display device which will produce an image on said video display device in accordance with said application program and in accordance with data received from said Internet.

22. A video game system comprising:

a video port for connecting to a video display device for displaying visual images to a human observer, a connector port for receiving a cartridge which can be removably connected to said second connector port, an I/O port for connecting to a control device, a system memory for receiving, storing and delivering system data and video data, said cartridge having an application program stored therein and being operative under control of a microprocessor to transfer data between an Internet and said video game system via a telephone line, said microprocessor coupled to a bus, said bus interconnecting said microprocessor, said I/O port and said connector, a video processor coupled to said microprocessor via said bus and said system memory for providing an interface between said microprocessor and said system memory to allow said microprocessor to communicate with said system memory, said video processor being further coupled to said video port for processing video display signals under the direction of said microprocessor, and said microprocessor being operative to communicate with said cartridge to connect said video game system to said Internet and transfer data between said Internet and said video game system via an Internet graphical user interface.

23. The video game system of claim 22, wherein said application programs includes a web browser program and wherein upon connection to said Internet said system displays a web browser graphical user interface.

24. The video game system of claim 23, wherein said cartridge includes flash memory which can cache more recently used web pages.

25. The video game system of claim 23, wherein said web browser includes a URL bar for entering web addresses in the form of first, second and third address portions where the second portion is sandwiched between the first and third portions, wherein said web browser is operative to automatically type the first and third portions such that the user only need type in the second portion.

26. The video game system of claim 23, wherein said web browser graphical user interface includes a web browser control area and an HTML viewing area, said control device is a game joystick having a first button for toggling between said web browser control area and said viewing area, a directional button having up and down directions for moving a cursor on said display, a second button which in conjunction with said directional button can page up or page down the viewing area and a select button for selecting an item on said viewing area.

27. The video game system of claim 23, wherein said control device is a joystick having (1) a directional button for moving a cursor on said display and (2) a select button for selecting an item in focus, wherein text data can be entered on an area of said web browser using said joystick and a virtual keyboard.

28. The video game system of claim 22, wherein said cartridge includes a flash memory for storing data transferred between the Internet and the game system and wherein said flash memory allows online updating of software when said system is connected to said Internet.

29. The video game system of claim 22, wherein said cartridge further includes:

a modem and a telephone port for transferrin data between said Internet and said video game system via a telephone line, and an interface adapter disposed between said modem and an edge connector on the cartridge, said interface adapter being operative to convert modem signals sent from said modem into game bus signals and vice-versa.

* * * * *